Figure 1:
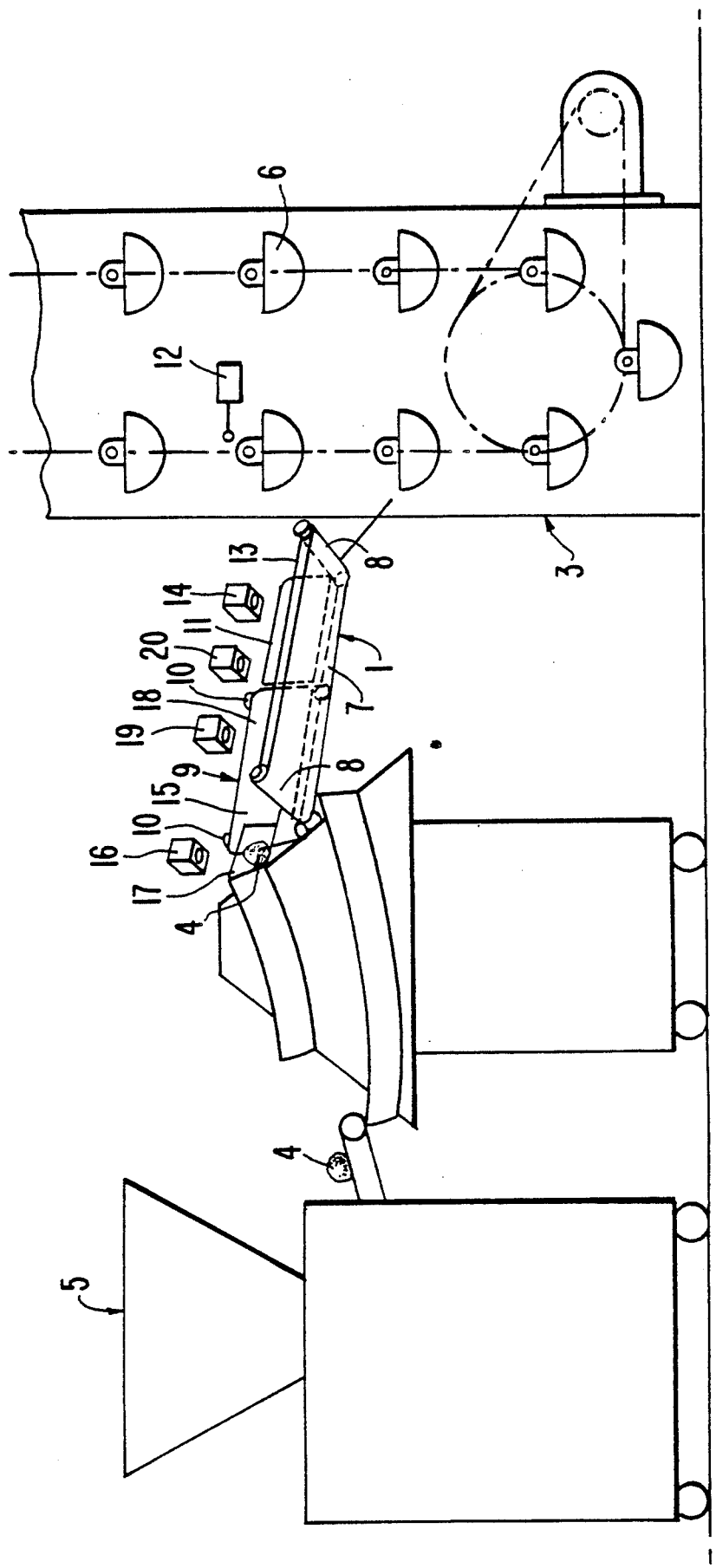

United States Patent [19]

Steeghs

[11] Patent Number: 4,991,709
[45] Date of Patent: Feb. 12, 1991

[54] DEVICE FOR TRANSFERRING OBJECTS FROM A SUPPLY DEVICE TO A TAKE UP DEVICE

[75] Inventor: Mathijs Steeghs, Panningen, Netherlands

[73] Assignee: Werner & Pfleiderer-Haton B.V., Panningen, Netherlands

[21] Appl. No.: 299,093

[22] Filed: Jan. 19, 1989

[30] Foreign Application Priority Data

Jan. 22, 1988 [NL] Netherlands .......................... 8800147

[51] Int. Cl.$^5$ ............................................. B65G 43/00
[52] U.S. Cl. .................................. 198/460; 198/464.2
[58] Field of Search ............................ 198/460, 464.2

[56] References Cited

U.S. PATENT DOCUMENTS

| 3,751,873 | 8/1973 | Toby | 198/460 X |
| 4,161,244 | 7/1979 | Hunter et al. | 198/460 X |
| 4,182,443 | 1/1980 | Pongracz | 198/460 |
| 4,360,098 | 11/1982 | Nordstrom | 198/460 X |

FOREIGN PATENT DOCUMENTS 55-44489 3/1980 Japan ................................. 198/460

Primary Examiner—H. Grant Skaggs
Assistant Examiner—Cheryl L. Gastineau
Attorney, Agent, or Firm—Foley & Lardner, Schwartz, Jeffery, Schwaab, Mack, Blumenthal & Evans

[57] ABSTRACT

Device for transferring objects (4) one by one from a supply device (2) by which the objects (4) are irregularly delivered, to a take up device (3), said transferring device (2,21) comprising two conveyors (7,9,22,23) which can separately be driven and from which only the first one (7,22) extends itself till near the take up device (3), a first sensor (12) for giving a ready-to-take-up signal when the take up device (3) can take up an object; a second sensor (14) for giving a signal when an object (4) is present at the end (13,26) of the conveyor (7,22) positioned near the take up device (3), and a third sensor (16) positioned near the place (15,27) where the objects (4) are supplied to the transferring device (1,21).

2 Claims, 2 Drawing Sheets

DEVICE FOR TRANSFERRING OBJECTS FROM A SUPPLY DEVICE TO A TAKE UP DEVICE

The invention relates to a device for transferring objects as e.g. lumps of dough—from a supply device as a dough dividing or rolling machine —by which the objects are irregularly delivered, to a take up device—as a proofing chamber provided with dough pockets—to which the objects have to be supplied one by one, said transferring device comprising at least one endless conveyor, a first sensor for giving a ready-to-take-up signal when the take up device can take up an object and a second sensor for giving a present signal when an object is present at that end of the conveyor positioned near the take up device, said signal taking care of bringing the conveyor to a stop as long as the first sensor is not giving a ready-for-take-up signal.

Although in the above it is spoken of transferring lumps of dough from a dough dividing or rolling machine to a proofing chamber, such a device can also be used for other objects when disadvantages are present as described below.

In particular when lumps of dough are worked in a rolling machines the movement of the lump of dough is caused by rolling friction because of which the lumps of dough will not leave the rolling machine in a correct regular way. When two lumps of dough are following each other too fast, it may happen that two lumps of dough will arrrive in one dough pocket of a proofing chamber by which two lumps of dough will get lost. When the period between the delivery of two lumps of dough is too long, it is possible that after taking up a lump of dough the conveyor will stand still when a next lump of dough is delivered to it because of which both lumps of dough will form one big mass and will get lost or will cause interruptions when they, together, are brought into one dough pocket of the proofing chamber.

Now the object of the invention is to remove these disadvantaages and to that end it is provided that the device comprises two conveyors which can separately be driven and from which only the first one extends itself till near the take up device and the second is ending at a distance from this, a third sensor being provided near the place where the objects are supplied to the transferring device by the supply device, said third sensor being able to detect the presence of an object near said place and which, when detecting an object takes care for putting or maintaining in operation one of said conveyors at least during a given period by which the detected object is brought at some distance from the beginning of the device.

By applying two conveyors instead of one single conveyor it is attained that said second conveyor can take care for directly moving an object which by the supply device is supplied to the transferring device. This can also take place when said first conveyor is standing still, to wit the conveyor which extends itself till near the take up device. As already said above the first conveyor will be stopped when said first sensor does not give a ready-for-taking-up signal, but an object is present near the end of said first conveyor.

Surprisingly it has appeared that by using two conveyors, which can be driven separately, and a third sensor, in many cases difficulties can be prevented which were described above. One and another depends on the number of objects which have to be transferred by the device per unit of time and the average distance between succeeding objects. Obviously also the velocity is important with which the objects are brought at a distance from the beginning of the device by the related conveyor.

To make the device suitable for handling different types of lumps of dough and/or for different transfer-velocities, it can be provided that the period during which the related conveyor is set into operation or is maintained in operation, is adjustable.

In particular it can be provided that the third sensor is positioned on a place above the supply device and right before the transferring device. When now a conveyor has to be put into operation this can be done before the object arrives on the related conveyor, because there always will be some retardation between the detection of an object by the third sensor and the operation of the conveyor.

In the case described above that lumps of dough are supplied to the transferring device by a rolling machine, said third sensor can be positioned above the gutter by means of which the lumps of dough are conveyed from the rolling machine to the transferring device.

If this should be necessary a further protection against the arrival of two lumps of dough in one dough pocket of the proofing chamber can be obtained by providing that the second sensor is executed such that it can detect more than one object and when detecting more than one object and when the first sensor is giving a ready-to-take-up signal will set the first conveyor into operation or will maintain it in operation, only during such a period that only one object is delivered to the take up device.

So in this way it is attained that when two objects should arrive too short after each other at the end of the first conveyor, only one object is delivered to the take up device.

Further it can be pointed out, that generally speaking the capacity of the supply device will be adjusted to that of the take up device by which it is prevented that a ready-to-take-up signal fails to appear too long. As already said above by using two conveyors and a third sensor it is already attained that two objects being supplied to the transferring device shortly after each other, still can be brought at a sufficient distance from each other to prevent difficulties.

According to a further elaboration of the invention it can be provided, that near the end of the second conveyor a fourth sensor is provided which will switch off the second conveyor when detecting an object and when the first conveyor is switched off. In this way it is attained that the second conveyor will not slide an object partially over a stationary surface by which the object might be damaged. Further also the possibility exists to provide a fifth sensor between the end of the second conveyor and the second sensor such that when the first conveyor is standing still the second conveyor is put into operation when by the fourth and fifth sensor no object is detected.

According to an embodiment of the invention both conveyors can make an angle with the horizontal plane such that a V-shaped conveyor is obtained and an object can be conveyed as well by the first as by the second conveyor, both conveyors starting near the supply device and the second conveyor ending at a distance from the take up device, between this end and the take up device a fixedly positioned bridging plate being provided lying in the plane of the second conveyor.

So an object brought on the beginning of both conveyors can be conveyed as well by the first as by the second conveyor but by the second conveyor only over a smaller distance than by the first conveyor. Only the first conveyor can deliver the object to the take up device. When the first conveyor is standing still because at its end an object is present but no ready-to-take-up signal is delivered by the first sensor, the second conveyor can be put into operation to bring an object, just delivered to the device, at a distance from the beginning of the conveyors.

In case of this in particular it will be provided that the second conveyor is only operating when the first conveyor is standing still. So generally speaking the first conveyor will serve for the conveying of an object and the delivering of this to the take up device.

By using a fourth sensor in the way as already described above, it is prevented that the second conveyor will slide an object partially over the stationary bridging plate by which the object might be damaged.

According to another embodiment of the invention it can be provided, that the two conveyors are mounted after each other, the second conveyor being in operation always when the first conveyor is in operation.

It will be obvious that when the first conveyor is in operation, the objects supplied to it by means of the second conveyor are supplied to the take up device so that also the second conveyor can be in operation. The first conveyor, however, is stopped when the second sensor is giving a presence signal, but the first sensor is not giving a ready-to-take-up signal. In that case also the second conveyor will be stopped. When now, however, the third sensor is detecting an object shortly before it will arrive on the beginning of the second conveyor, said second conveyor will be put into operation to bring the object directly at some distance from the beginning of the second conveyor. As already said above the second conveyor in each case will be stopped when use is made of a fourth sensor and this sensor is detecting an object at the end of the second conveyor whilst the first conveyor is standing still.

Although it is indicated above that a device according to the present invention in particular can be applied between e.g. a rolling machine and a proofing chamber, it has to be remarked that the device also can be used for supplying lumps of dough which are removed from the proofing chamber to a succeeding machine as e.g. a dough forming machine.

From what is said above it will be obvious that in each pocket of a proofing chamber only one lump of dough may be brought so that only the possibility exist that in a dough pocket no lump of dough is present. In view of this the removal of lumps of dough from the proofing chamber can only take place at a smaller rate and a next handling device will be adjusted at this smaller rate. Also in this case a device according to the invention can be applied to assure a regular supply of lumps of dough to the next handling device.

Figure 2:
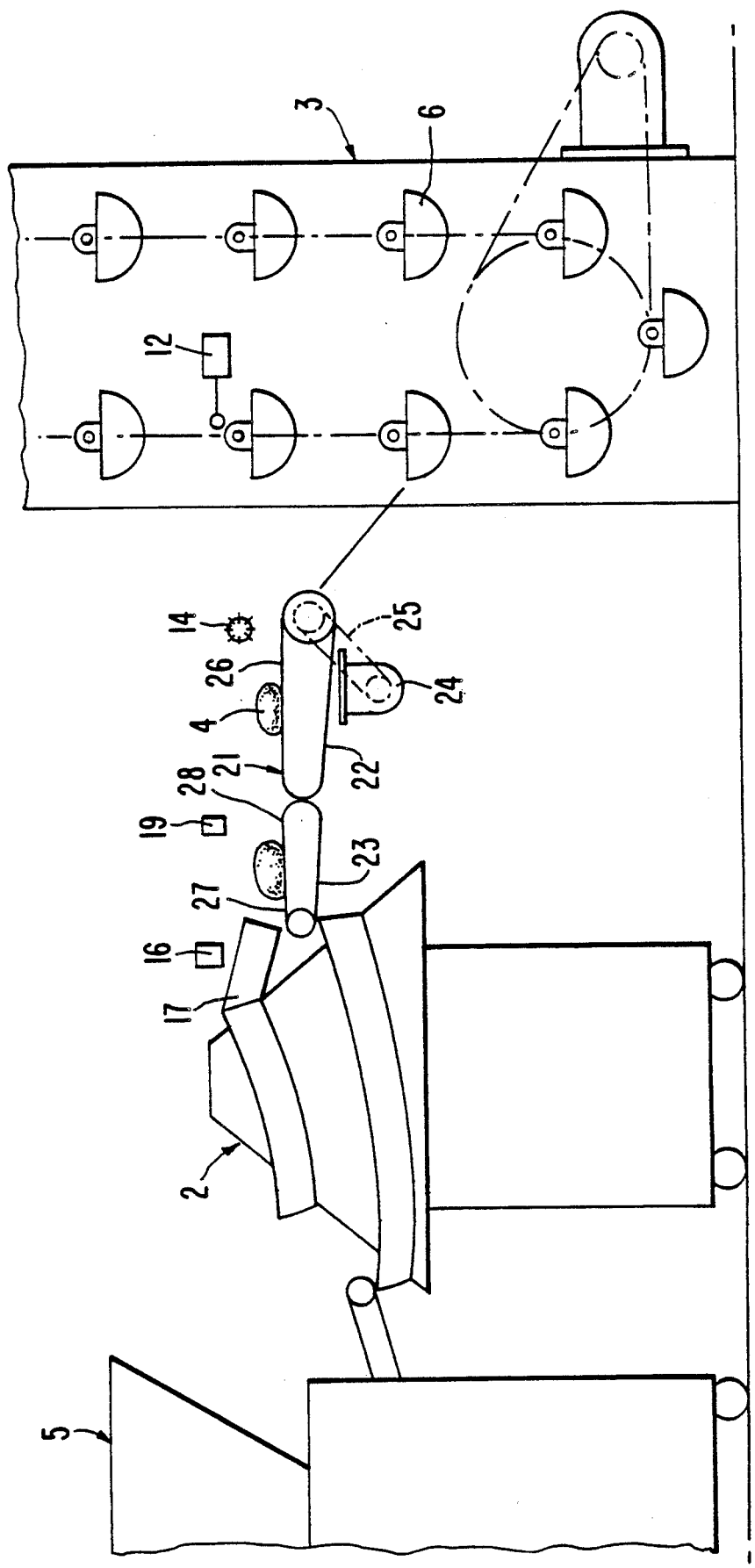

Now the invention is described by means of embodiments shown in the drawing, in which:

FIG. 1 schematically shows a perspective view of an embodiment of a device according to the invention provided between a dough rolling machine and a proofing chamber; and FIG. 2 schematically shows a side view of an other embodiment of the device, as well provided between a dough rolling machine and a proofing chamber.

The device 1 shown in FIG. 2 is provided between a dough rolling machine 2 and a proofing chamber 3. To the dough rolling machine object 4, in this case lumps of dough, are supplied which are conveyed from a dough dividing machine 5. From the dough rolling machine 2 the objects 4 have to be brought one by one in the dough pockets 6 of the proofing chamber 3. The device 1 comprises a first conveyor belt 7, running over end rolls 8 from which one is driven by a motor in a not further indicated way.

The device 1 further comprises the second conveyor belt 9 running over the rolls 10 from which again one can be driven by a motor.

The two conveyors 7 and 9 are mounted at an angle with the horizontal plane such that a V-shaped conveyor is obtained. The second conveyor 9 ends prior to the first conveyor 7 and the bridging plate 11 joins the end of the conveyor 9.

To observe whether in the proofing chamber 3 a dough pocket 6 is at the right place for taking up an object 4, a sensor 12 is provided in or near the proofing chamber, which can give a ready-to-take-up signal.

A sensor 14 is provided near the end 13 of the conveyor 7 for observing whether an object 4 is present near this end 13. As long as the sensor 12 is giving a ready-to-take-up signal the conveyor 7 will be in operation and an object being moved by the conveyor will be signalized by the sensor 14 and will be brought in a dough pocket 6.

Obviously the sensor 14 will be positioned such that after detecting a lump of dough sufficient time is disposable to set the conveyor out of work if necessary. This is the case when the sensor 12 is not giving a ready-to-take-up signal.

Near the place 15 where the objects 4 are delivered to the device 1 a sensor 16 is provided. This sensor 16 in particualr can be directed to the gutter 17 via which the objects 4 are supplied from the dough roller machine 2 to the device 1. So the sensor 16 is already observing the object 4 before it arrives on the device 1 so that there is time to bring the conveyor 9 into operation when the conveyor 7 is standing still. When the conveyor 7 moves it is not necessary to switch in the conveyor 9.

As already said above the conveyor 9 will be put into operation during a given period when the conveyor 7 is standing still and the sensor 16 is detecting an object 4, so that the object 4 is brought directly at some distance from the place 15 of arrival. Then the conveyor 9 is again stopped and the further conveying of the object 4 can take place by means of the conveyor 7. The time during which the conveyor 9 is working, can be adjustable. By this the device can be adjusted to different working conditions.

In practice it has appeared that by applying the second conveyor 9 and the sensor 16 the objects 4 can be already moved by the conveyor 7 in such a way that two objects will not be too close together near the end 13 of the conveyor 7. To exclude the danger that two lumps of dough simultaneously are supplied to one dough pocket 6, it can be provided that the sensor 14 can detect more than one object 4. When now two objects will be present close together on the conveyor 7, the conveyor 7 will directly be switched off by the sensor 14 after the foremost object is removed from the conveyor 7. The conveyor 7 is not earlier put into working than after the sensor 12 has delivered a new ready-to-take-up signal.

Still a further sensor 19 can be provided near the end 18 of the conveyor 9 and taking care for it that when the conveyor 7 is standing still also the conveyor 9 is set out of operation or is maintained out of operation when the sensor 19 is detecting an object 4. In this way it is prevented that the conveyor 9 will press an object against the stationary bridging plate 11.

Finally a sensor 20 can be provided between the end of the conveyor 9 and the sensor 14. When neither the sensor 20 nor the sensor 19 is detecting an object, the conveyor 9 can be switched in so that an object supplied to the device is directly conveyed further also when the conveyor 7 is standing still.

Also the possibility exists to combine the sensors 19 and 20 and position these about at the place where the conveyor 9 and the bridging plate 11 are joining.

FIG. 2 shows another embodiment of the device according to the invention. In this Figure the parts corresponding with those from FIG. 1 are indicated with the same reference numbers. The device 21 shown in FIG. 2 comprises two conveyors 22 and 23 which are mounted one after the other. A lump of dough 4, being supplied by the dividing machine 5 to the rolling machine 2, is brought on the conveyor 23 from the dough rolling machine 2 via the gutter 17 and from this conveyor 23 onto the conveyor 22 which is supplying the lump of dough to a dough pocket 6 of the proofing chamber 3.

The conveyor 22 is driven by means of the motor 24 and the transmission 25 whilst driving of the conveyor 23 takes place in a corresponding way by means of a separate motor not further indicated.

To bring the objects 4 from the end 26 of the conveyor 22 into the dough pockets 6 in the right way again use is made of the sensors 12 and 14 working in a corresponding way as described above on hand of FIG. 1.

Above the gutter 17 again the sensor 16 is present which, when detecting an object 4, can switch in the conveyor 23 during a given, adjustable period to bring an object 4, arrived on it, directly at some distance form the beginning 27 of the conveyor 23. A sensor 19 can be provided near the end 28 of the conveyor 23 in the way as already described above, to prevent that, when the conveyor 22 is standing still, by means of the conveyor 23 an object is slided on this stationary conveyor. In the way as already described above also use can be made of a sensor 20 or of a combination of the sensors 19 and 20.

All these possibilities, however, need not be further elucidated.

Further it will be obvious that only some embodiments are shown in the drawing and are discussed above and that many modifications can be made without departing from the spirit of the invention.

I claim:

1. A device (1) for transferring objects (4) from a supply device (2) from which the objects (4) are irregularly delivered to a take up device (3) having pockets (6) to which the objects (4) are to be supplied one by one, the transferring device (1) comprising at least one endless conveyor (7,9), a first sensor (12) for producing a ready-to-take-up signal when the take up device (3) can take up an object (4), and a second sensor (14) for producing a present signal when an object (4) is present at an end (13) of the conveyor (7) positioned near the take up device (3), the signal from the second sensor bringing the conveyor to a stop (7) as long as the first sensor (12) is not producing a ready-for-take-up signal, the transferring device (1) comprises two conveyors (7,9) which are spearately driven, both conveyors (7,9) starting near the supply device (2), the first conveyor (7) extending to a point near the take up device (3), the second conveyor (9) extending from a point near the supply device (2) to an end point at a distance between the supply device (2) and the take up device (3), a fixedly positioned bridging plate (11) lying in the plane of the second conveyor (9) extending from the end point to a point near the take up device (3), both conveyors (7,9) being set at an angle to the horizontal plane such that a V-shaped conveyor is obtained and the objects (4) can be conveyed by the first conveyor (7) as well as by the second conveyor (9), a third sensor (16) located near the point (15) where the objects (4) are supplied to the transferring device (1) by the supply device (2), the third sensor (16) detecting the presence of an object (4) near the point (15) where objects are supplied and which, when detecting the object (4) causes operation of one of the conveyors (9) at least during a given period during which the detected object (4) is brought to a point at a distance form the beginning (15) of the device (1).

2. Device according to claim 1, wherein the second conveyor (9) is only operating when the first conveyor (7) is standing still.

* * * * *